(12) United States Patent
Kvisteroey et al.

(10) Patent No.: US 7,513,143 B2
(45) Date of Patent: Apr. 7, 2009

(54) SYSTEM FOR ELECTRO-STATICALLY INDICATING MOVEMENT OF TREAD

(75) Inventors: Terje Kvisteroey, Horten (DE); Dirk Hammerschmidt, Villach (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 11/849,603

(22) Filed: Sep. 4, 2007

(65) Prior Publication Data

US 2009/0056433 A1  Mar. 5, 2009

(51) Int. Cl.
*G01M 17/02* (2006.01)
(52) U.S. Cl. .......................................... 73/146
(58) Field of Classification Search .................. 73/146, 73/146.5; 340/447
See application file for complete search history.

(56) References Cited

U.S. PATENT DOCUMENTS

| | | | |
|---|---|---|---|
| 5,864,056 A | 1/1999 | Bell et al. | |
| 6,105,423 A | 8/2000 | Prottey | |
| 6,538,566 B1 * | 3/2003 | Morand et al. | 340/444 |
| 6,539,295 B1 | 3/2003 | Katzen et al. | |
| 6,666,079 B2 * | 12/2003 | Poulbot et al. | 73/146 |
| 7,180,409 B2 | 2/2007 | Brey | |
| 7,302,868 B2 * | 12/2007 | Shima et al. | 73/862.69 |
| 2003/0056579 A1 * | 3/2003 | Poulbot et al. | 73/146 |
| 2003/0062994 A1 * | 4/2003 | Morand et al. | 340/443 |
| 2006/0081043 A1 * | 4/2006 | Silverbrook et al. | 73/146 |
| 2006/0201240 A1 | 9/2006 | Morinaga | |
| 2007/0272006 A1 * | 11/2007 | Demaie et al. | 73/146 |

* cited by examiner

*Primary Examiner*—Andre J Allen
(74) *Attorney, Agent, or Firm*—Dicke, Billig & Czaja, PLLC

(57) ABSTRACT

A system including a first electrode embedded in tread of a tire. The first electrode is configured for electro-statically indicating movement of the tread.

24 Claims, 4 Drawing Sheets

US 7,513,143 B2

SYSTEM FOR ELECTRO-STATICALLY INDICATING MOVEMENT OF TREAD

BACKGROUND

Consumers and law makers continue pushing for improvements in vehicle safety, fuel economy, and pollution control. In response, manufacturers continue developing and integrating systems, such as anti-lock braking systems (ABS), electronic stability control (ESC), vehicle stability control (VSC), active steering, active suspension control, and tire pressure monitoring (TPM), into their vehicles. To more fully achieve the benefits of these systems, information is needed about the interaction between the tires and the road or driving surface.

Typically, a tire includes an inner liner that lines the inside of the tire, multiple ply layers over the inner liner, and one or more steel belts over the ply layers. A cushion layer and a base layer are situated over the steel belts and a cap layer, also referred to as the tread layer, is situated on the outside of the tire over the base layer. The tread interacts with the road surface to provide traction.

Some tire monitoring systems have been attached to the inner liner of the tire, which avoids integrating sensing elements directly into the harsh mechanical and chemical environment experienced by the tread. These tire monitoring systems obtain information about global deformations of the tire, such as tire pressure. However, they do not obtain information about local deformations in the tread and the interaction between the tread and the driving surface.

For these and other reasons there is a need for the present invention.

SUMMARY

One embodiment described in the disclosure provides a system including a first electrode embedded in tread of a tire. The first electrode is configured for electro-statically indicating movement of the tread.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
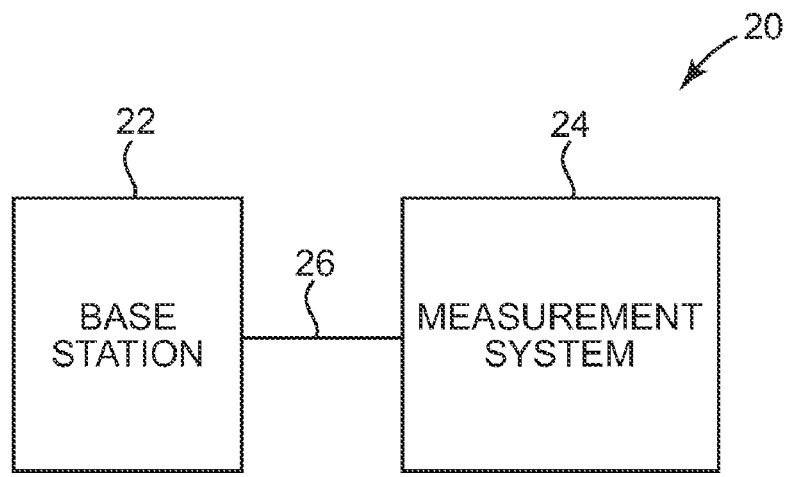
FIG. 1 is a block diagram illustrating one embodiment of a tire monitoring system.

FIG. 1 is a block diagram illustrating one embodiment of a tire monitoring system 20 according to the present invention. Tire monitoring system 20 is used on a vehicle, such as an automobile, bus, truck, or motorcycle, to measure tread movement on one or more of the vehicle's tires. Tire monitoring system 20 obtains measured values of tread movement while the vehicle is in operation, and the vehicle uses the measured values to enhance operation of the vehicle's systems, such as ABS, ESC, VSC, active steering, active suspension control, and TPM.

Tire monitoring system 20 includes a base station 22 and a measurement system 24. Base station 22 and measurement system 24 communicate via communications path 26. Measurement system 24 provides measured values of tread movement on a tire to base station 22. Base station 22 receives measured values of tread movement from measurement system 24 and transmits the measured values to vehicle electronics. In one embodiment, tread movement on each of the vehicle's tires is measured via a measurement system, such as measurement system 24. In one embodiment, a base station, such as base station 24, is attached to each of the vehicle's tires. In one embodiment, a base station, such as base station 22, is attached to each of the vehicle's wheels, wheel hubs, or wheel housings. In other embodiments, base station 22 is attached to a suitable part of the vehicle, such as the vehicle's chassis.

Measurement system 24 measures tread movement on a tire electro-statically via electrodes embedded in the tread of the tire. The treads move in response to contact and interaction with the driving surface, where tread movement includes tread displacement and compression. In one embodiment, each of the embedded electrodes includes an electret material. In one embodiment, multiple electrodes, such as dozens, hundreds, or thousands of electrodes, are embedded in a tire.

In one embodiment, a tire including embedded electrodes includes at least one steel belt and an electrical potential on the steel belt changes in response to movement of one or more embedded electrodes. In one embodiment, a second electrode is coupled to the embedded electrode(s) and an electrical potential on the second electrode changes in response to movement of the embedded electrode. In one embodiment, a second electrode is capacitively coupled to the embedded electrode(s) via at least one steel belt and an electrical potential on the second electrode changes in response to changes in the electrical potential on the steel belt.

Base station 22 receives the measured values from measurement system 24. In one embodiment, base station 22 receives the measured values via a second electrode. In one embodiment, base station 22 and measurement system 24 are configured to communicate via capacitive coupling. In one embodiment, base station 22 and measurement system 24 are configured to communicate via inductive coupling. In one embodiment, base station 22 and measurement system 24 are configured to communicate via radio frequency communications.

The vehicle includes electronics that communicate with each of the base stations, such as base station 22, and the vehicle uses the measured values to enhance operation of the vehicle. The vehicle electronics obtain parameters, such as temperatures at different positions in the tread, deformations in the tread, and relative displacements in the tread and shape of the footprint of the tire on the driving surface. These parameters give information about a tire's condition, wear, relative displacements such as slip angle and friction, and driving loads. The vehicle uses the measured values of tread movement to obtain these parameters and enhance operation of vehicle systems, such as ABS, ESC, VSC, active steering, active suspension control, and TPM. Embedding an electrode in the tread of a tire is a simple, low cost, and reliable way of obtaining measurements of tread movement, outside the steel belts of the tire.

Figure 2:
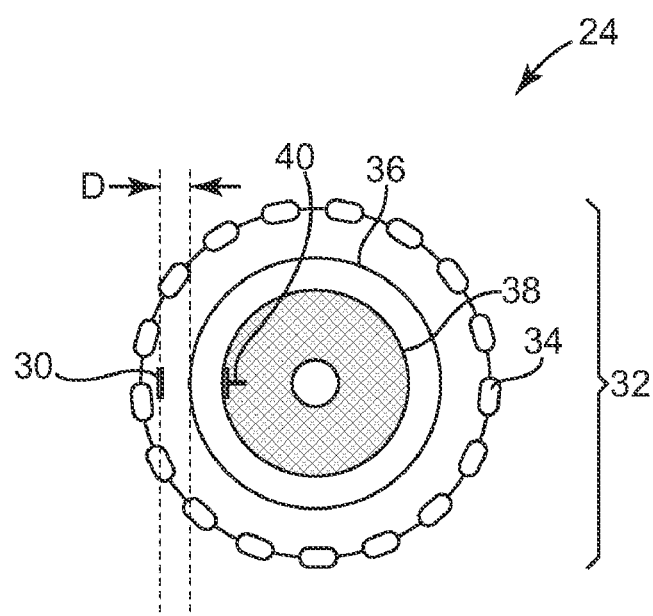
FIG. 2 is a diagram illustrating one embodiment of a measurement system.

FIG. 2 is a diagram illustrating one embodiment of a measurement system 24 that includes an electrode 30 embedded in a tire 32. Electrode 30 includes an electret material that carries an electrostatic charge. Tire 32 includes a tread area 34, a steel belt 36, and an inner liner 38. Electrode 30 is embedded in tread area 34 that is situated outside steel belt 36. A detection electrode 40 is attached to inner liner 38 that is situated inside steel belt 36. In one embodiment, multiple electrodes, such as electrode 30, are embedded in tread area 34 of tire 32. In one embodiment, multiple electrodes, such as detection electrode 40, are attached to inner liner 38. In other embodiments, one or more electrodes, such as detection electrode 40, are attached to the wheel housing that surrounds tire 32.

Electrodes, such as electrode 30, are positioned in tread area 34 where tread displacement and compression due to driving surface interaction are of interest. In one embodiment, electrode 30 is embedded into tread area 34 of tire 32 during the tire manufacturing process. In one embodiment, electrode 30 is embedded into tread area 34 after the vulcanizing process by pressing the electrodes into tread area 34 in a way that is similar to pressing winter tire nails into a finished tire.

Measurement system 24 provides measured values of tread movement on tire 32 to base station 22 (shown in FIG. 1) for measuring tread parameters, such as relative displacement and compression. Tire 32 is attached to a vehicle that receives the measured values of tread movement via base station 22. In one embodiment, base station 22 is attached to inner liner 38. In other embodiments, base station 22 is attached to one of the wheels, wheel hubs, or wheel housings holding or surrounding tire 32 or to the vehicle's chassis.

In operation, electrode 30 is displaced relative to steel belt 36 as tire 32 interacts with the driving surface. Since electrode 30 includes an electret material having an electrostatic charge, displacement D of embedded electrode 30 changes the electrical potential on steel belt 36. Detection electrode 40 is capacitively coupled to electrode 30 via steel belt 36 and a change of electrical potential on steel belt 36 changes the electrical potential on detection electrode 40. The change in electrical potential on steel belt 36 and the change in electrical potential on detection electrode 40 are measurements of tread movement in tread area 34.

Base station 22 receives measured values of tread movement via detection electrode 40. In one embodiment, detection electrode 40 is capacitively coupled to base station 22. In one embodiment, detection electrode 40 is inductively coupled to base station 22. In one embodiment, detection electrode 40 is coupled to base station 22 via a radio frequency transceiver.

Figure 3:
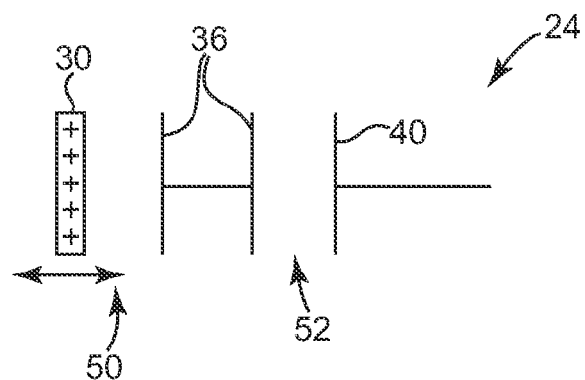
FIG. 3 is a diagram illustrating the electrical circuit of the measurement system of FIG. 2.

FIG. 3 is a diagram illustrating measurement system 24 of FIG. 2. Measurement system 24 includes embedded electrode 30, steel belt 36, and detection electrode 40. Embedded electrode 30 is embedded in tread area 34 and detection electrode 40 can be randomly placed on inner liner 38.

Detection electrode 40 and embedded electrode 30 make up a capacitor, where steel belt 36 operates as a coupling electrode between detection electrode 40 and embedded electrode 30. Embedded electrode 30 and steel belt 36 are capacitively coupled at 50, and steel belt 36 and detection electrode 40 are capacitively coupled at 52.

In operation, electrode 30 moves relative to steel belt 36 and the electrical potential on steel belt 36 changes. In response to the electrical potential change on steel belt 36, the electrical potential changes on detection electrode 40. The change in electrical potential on steel belt 36 and the change in electrical potential on detection electrode 40 are measurements of tread movement in tread area 34.

Figure 4:
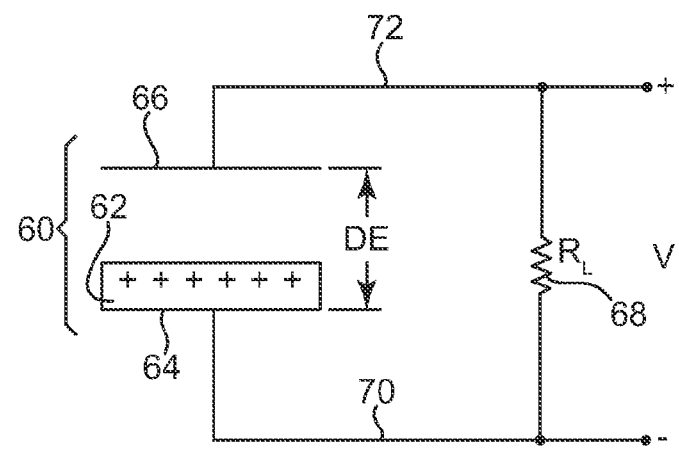
FIG. 4 is a diagram illustrating one embodiment of a capacitor including an electret material in the capacitor gap and a resistive load.

FIG. 4 is a diagram illustrating one embodiment of a capacitor 60 including an electret material 62, i.e. a charged dielectric, in the capacitor gap. Capacitor 60 includes a first electrode 64 and a second electrode 66. First electrode 64 includes the attached electret material 62 and is electrically coupled to one side of a resistive load 68 via first electrode line 70. Second electrode 66 is electrically coupled to resistive load 68 via second electrode line 72. In one embodiment of the tire monitoring system 20, first electrode 64 is similar to embedded electrode 30 and second electrode 66 is similar to detection electrode 40.

Electret material 62 is a dielectric material that has a quasi-permanent or permanent electric charge or dipole polarization. Electret material 62 generates internal and external electric fields and is the electrostatic equivalent of a permanent magnet. In one embodiment, electret material 62 includes charged polymer layers. In one embodiment, electret material 62 includes trapped charges between silicon oxide and silicon nitride layers. In one embodiment, electret material 62 includes charges trapped via corona discharge between silicon oxide and silicon nitride layers.

In operation, first electrode 64 and second electrode 66 move relative to one another, which changes the distance DE between first electrode 64 and second electrode 66. This change in electrode distance DE, results in a change in the capacitance that results in a change in the voltage V across capacitor 60 due to the pre-charged electret material 62. The voltage V across capacitor 60 and across resistive load 68 changes in response to a change in the distance between electret material 62 of first electrode 64 and second electrode 66. In one embodiment, one of the first and second electrodes 64 and 66 is fixed and the other one of the first and second electrodes 64 and 66 moves.

Figure 5:
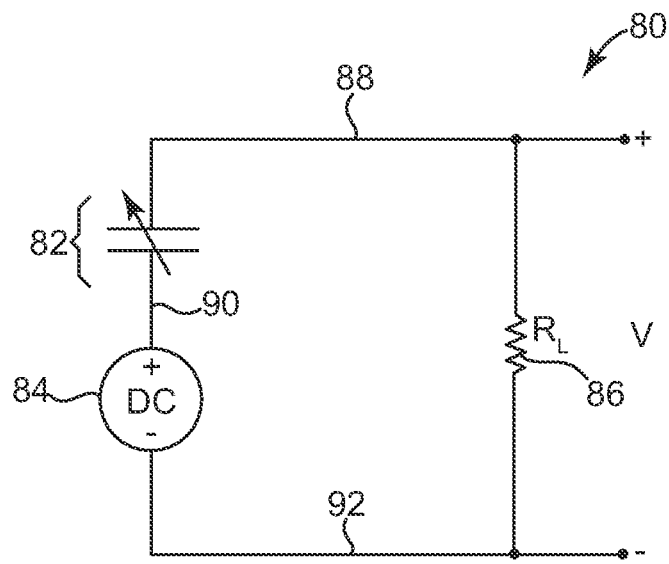
FIG. 5 is a diagram illustrating an electrical equivalence circuit for the capacitor and resistive load of FIG. 4.

FIG. 5 is a diagram illustrating an electrical equivalence circuit 80 for capacitor 60 and resistive load 68 of FIG. 4.

Equivalence circuit 80 includes a variable capacitor 82, a DC voltage source 84, and a resistive load 86. One side of variable capacitor 82 is electrically coupled to one side of resistive load 86 via load line 88. The other side of variable capacitor 82 is electrically coupled to one side of voltage source 84 via source line 90, and the other side of voltage source 84 is electrically coupled to the other side of resistive load 86 via load line 92.

Variable capacitor 82 represents the changing capacitance value of capacitor 60 as first electrode 64 and second electrode 66 move relative to one another. Voltage source 84 represents the pre-charged electret material 62 of first electrode 64. As the capacitance value of variable capacitor 82 changes, the voltage V across resistive load 86 changes. In one embodiment, the top electrode at 88 of variable capacitor 82 is similar to detection electrode 40 and the DC voltage source 84 is similar to embedded electrode 30.

Figure 6:
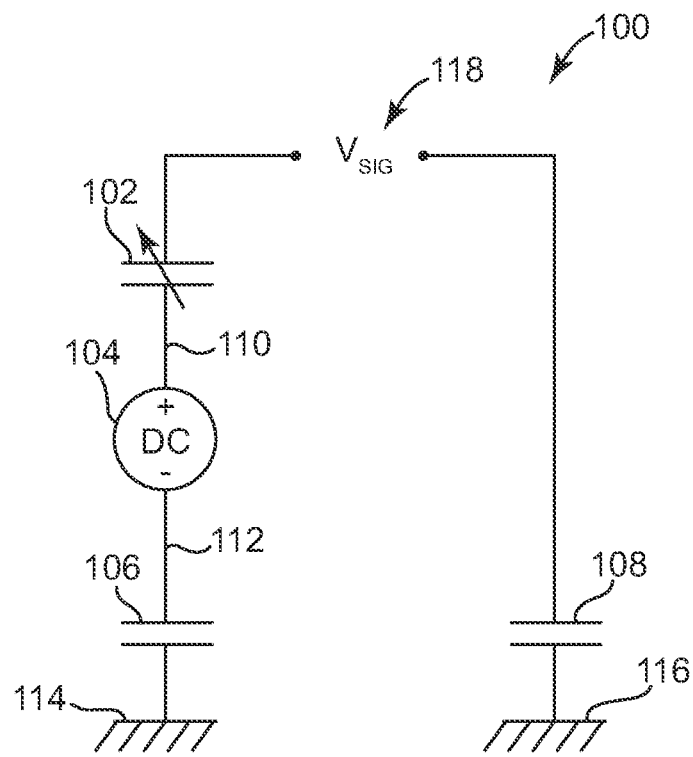
FIG. 6 is a diagram illustrating an electrical equivalence circuit for the measurement system of FIG. 2.

FIG. 6 is a diagram illustrating an electrical equivalence circuit 100 for the measurement system 24 of FIG. 2, which includes embedded electrode 30 and tire 32. Equivalence circuit 100 includes a variable capacitor 102, a DC voltage source 104, a first capacitor 106, and a second capacitor 108. One side of variable capacitor 102 is electrically coupled to one side of voltage source 104 via first source line 110. The other side of voltage source 104 is electrically coupled to one side of first capacitor 106 via second source line 112. The other side of first capacitor 106 is electrically coupled to a reference, such as ground at 114. One side of second capacitor 108 is electrically coupled to a reference, such as ground at 116. Voltage signal VSIG at 118 is provided between first capacitor 106 and second capacitor 108.

Variable capacitor 102 and voltage source 104 are the equivalent circuit for a capacitor including an electret material and they represent embedded electrode 30, steel belt 36, and detection electrode 40 (shown in FIG. 2). First capacitor 106 represents the capacitive coupling between the electret capacitor including embedded electrode 30, steel belt 36, and detection electrode 40 and the wheel housing or vehicle chassis. Second capacitor 108 represents the capacitive coupling between a reference electrode, e.g. a reference capacitor mounted to inner liner 38, and the wheel housing or vehicle chassis.

The capacitive couplings of first capacitor 106 and second capacitor 108 change over the rotation of tire 32 due to the changing position of embedded electrode 30 and the changing position of the reference electrode with respect to the wheel housing or chassis. These changes follow a cyclic pattern due to the rotation of tire 32 and they are in a constant phase relationship with one another. As a result, the cyclic patterns can be cancelled out via electronic processing to leave the voltage signal VSIG at 118 due to movement of embedded electrode 30 in tread area 34. In one embodiment, the reference electrode is the rim of the wheel holding tire 32.

In operation, electrode 30 moves relative to steel belt 36 and detection electrode 40. This movement is represented via a change in the capacitance value of variable capacitor 102, which results in a change in voltage signal VSIG at 118. The cyclic patterns due to tire rotation and capacitive coupling of first capacitor 106 and second capacitor 108 are cancelled out via electronic processing and the remaining signal is the measured value of tread movement on tire 32.

Figure 7:
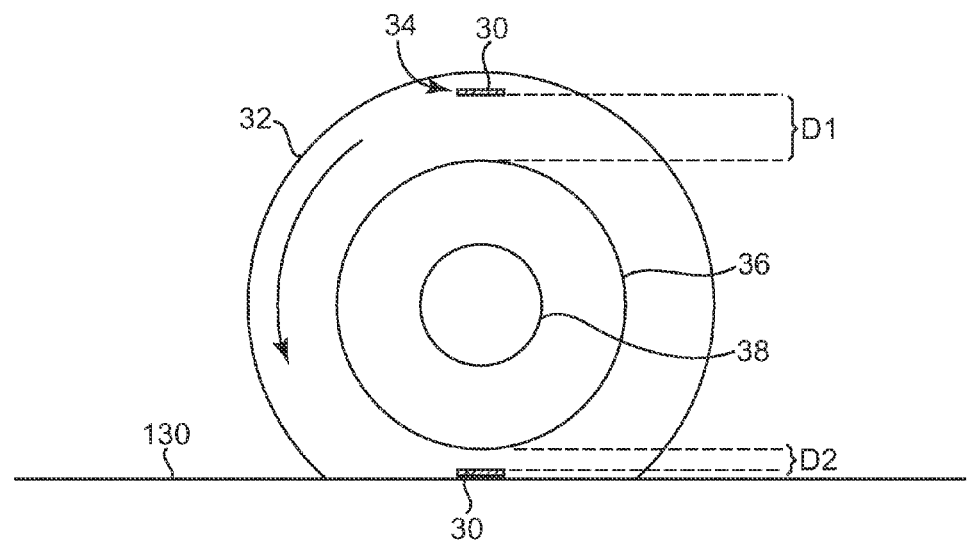
FIG. 7 is a diagram illustrating tread deformations in the tread area of a tire that result from interactions with a driving surface as the tire rolls in a straight line.
Figure 8:
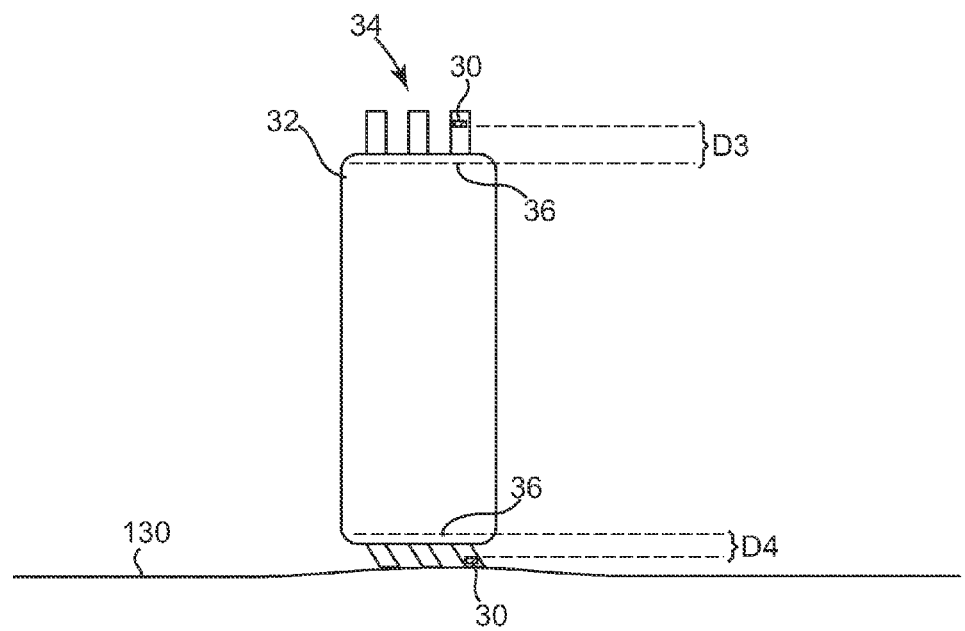
FIG. 8 is a diagram illustrating tread deformations in the tread area of a tire that result from interactions with the driving surface as the vehicle and the tire turn a corner.

FIGS. 7 and 8 are diagrams illustrating tread deformations in tread area 34 that result from tread interaction with driving surface 130. The tread deformations in tread area 34 are shown in relation to steel belt 36. The tread deformations depend upon the load on tire 32, which changes with the conditions of the driving surface 130 and driving situations, such as speed and cornering.

FIG. 7 is a diagram illustrating tread deformations in tread area 34 that result from interactions with driving surface 130 as tire 32 rolls in a straight line from right to left. In an initial position, the distance between embedded electrode 30 and steel belt 36 is distance D1. As tire 32 rolls from right to left, the tread area 34 comes into contact with driving surface 130 and the distance between embedded electrode 30 and steel belt 36 diminishes to a distance D2. The difference between distance D1 and D2 is a measure of tread movement that is measured via measurement circuit 24 and used by the vehicle to enhance the operation of the vehicle's systems.

FIG. 8 is a diagram illustrating tread deformations in tread area 34 that result from interactions with driving surface 130 as the vehicle and tire 32 turn a corner. In an initial position, the distance between embedded electrode 30 and steel belt 36 is a distance D3. As tire 32 rotates, the tread area 34 comes into contact with driving surface 130 and while cornering the distance between embedded electrode 30 and steel belt 36 diminishes to distance D4. The difference between distance D3 and D4 is a measure of tread movement that is measured via measurement circuit 24 and used by the vehicle to enhance the operation of the vehicle's systems.

Tire monitoring system 20 obtains measured values of tread movement while the vehicle is in operation. The vehicle uses the measured values to enhance operation of the vehicle's systems, such as ABS, ESC, VSC, active steering, active suspension control, and TPM. Embedding an electrode, such as electrode 30, in the tread of a tire is a simple, low cost, and reliable way of obtaining measurements of tread movement, outside the steel belts of the tire.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A system, comprising:
a first electrode embedded in tread of a tire and configured for electro-statically indicating movement of the tread, wherein the first electrode includes an electret material having an electrostatic charge.

2. The system of claim 1, wherein a first electrical potential on a steel belt of the tire changes in response to movement of the first electrode.

3. The system of claim 2, comprising:
a second electrode coupled to the first electrode via the steel belt, wherein a second electrical potential on the second electrode changes in response to chances in the first electrical potential and movement of the first electrode.

4. The system of claim 1, comprising:
a second electrode capacitively coupled to the first electrode.

5. The system of claim 4, wherein electrical potential on the second electrode changes in response to movement of the first electrode.

6. The system of claim 4, wherein the second electrode is situated on an inner lining of the tire.

7. The system of claim 4, comprising:
a wheel housing, wherein the second electrode is situated on the wheel housing.

8. The system of claim 1, comprising:
a second electrode coupled to the first electrode via at least one steel belt of the tire.

9. The system of claim 4 comprising:
a base station configured to obtain values that indicate movement of the first electrode via the second electrode.

10. A system comprising:
a tire including tread;
a first electrode embedded in the tread;
at least one steel belt in the tire; and
a second electrode coupled to the first electrode via the at least one steel belt, wherein the first electrode includes an electret material having an electrostatic charge and the at least one steel belt is situated between the first electrode and the second electrode.

11. The system of claim 10, wherein a first electrical potential on the at least one steel belt changes in response to movement of the first electrode and a second electrical potential on the second electrode changes in response to changes in the first electrical potential.

12. The system of claim 10, wherein the tire includes an inner lining and the second electrode is situated on the inner lining.

13. The system of claim 10, comprising:
a wheel housing, wherein the second electrode is situated on the wheel housing.

14. The system of claim 10, comprising:
a base station configured to receive values that indicate movement of the first electrode via the second electrode.

15. The system of claim 14, wherein the base station receives the values via the second electrode and one of capacitive coupling, inductive coupling, and radio frequency communications.

16. A system comprising:
means for contacting surfaces; and
means for measuring movement of the means for contacting surfaces, wherein the means for measuring movement includes an electret material having an electrostatic charge.

17. The system of claim 16, wherein the means for measuring comprises:
means for indicating electro-statically movement of the means for contacting surfaces, wherein the means for indicating includes the electret material having an electrostatic charge and is embedded in the means for contacting surfaces.

18. A method of monitoring a tire, comprising:
moving tread of the tire; and
indicating movement of the tread electro-statically via a first electrode that includes electret material having an electrostatic charge embedded in the tread.

19. The method of claim 18, comprising:
changing a first electrical potential on a steel belt in the tire via movement of the tread.

20. The method of claim 19, comprising:
changing a second electrical potential on a second electrode via changes in the first electrical potential.

21. The method of claim 18, comprising:
coupling the first electrode to a second electrode via at least one steel belt situated between the first electrode and the second electrode.

22. A method of monitoring a tire, comprising:
deforming tread on the tire;
moving a first electrode that includes an electret material having an electrostatic charge via deformation of the tread.

23. The method of claim 22, comprising:
coupling the first electrode to a second electrode via at least one steel belt situated between the first electrode and the second electrode.

24. The method of claim 23, comprising:
changing a first electrical potential on the at least one steel belt via movement of the first electrode; and
changing a second electrical potential on the second electrode via changes in the first electrical potential.

* * * * *

UNITED STATES PATENT AND TRADEMARK OFFICE
CERTIFICATE OF CORRECTION

PATENT NO. : 7,513,143 B2
APPLICATION NO. : 11/849603
DATED : April 7, 2009
INVENTOR(S) : Kvisteroey et al.

Page 1 of 1

It is certified that error appears in the above-identified patent and that said Letters Patent is hereby corrected as shown below:

Column 6, line 56, delete "chances" and insert in place thereof --changes--.

Signed and Sealed this

Eleventh Day of August, 2009

David J. Kappos
*Director of the United States Patent and Trademark Office*